United States Patent [19]

Horton et al.

[11] Patent Number: 4,914,335

[45] Date of Patent: Apr. 3, 1990

[54] PHASE-DISPLACED MULTIPLE POLYPHASE DYNAMOELECTRIC MACHINE WITH WAVE WINDINGS

[75] Inventors: Malcolm D. Horton, Schenectady; Manoj R. Shah, Latham; Charles J. Czech, Clifton Park, all of N.Y.

[73] Assignee: General Electric Company, Schenectady, N.Y.

[21] Appl. No.: 275,486

[22] Filed: Nov. 23, 1988

[51] Int. Cl.$^4$ .............................................. H02K 3/28
[52] U.S. Cl. ..................................... 310/207; 310/71; 310/195; 310/198
[58] Field of Search ........ 310/179, 180, 184, 198–207, 310/71, 215

[56] References Cited

U.S. PATENT DOCUMENTS

| | | | |
|---|---|---|---|
| 1,356,936 | 10/1920 | MacMillan | 310/202 |
| 3,621,311 | 11/1971 | Von Starck | 310/207 |
| 3,919,576 | 11/1975 | Reinbeck | 310/207 |
| 4,132,914 | 1/1979 | Khutoretsky | 310/205 |
| 4,331,896 | 5/1982 | Sedgewick | 310/207 |
| 4,398,112 | 8/1983 | van Gils | 310/207 |
| 4,500,806 | 2/1985 | Kanayama | 310/207 |
| 4,675,591 | 6/1987 | Pleiss | 310/198 |

FOREIGN PATENT DOCUMENTS

| | | | |
|---|---|---|---|
| 1080676 | 4/1960 | Fed. Rep. of Germany | 310/207 |
| 2348641 | 4/1975 | Fed. Rep. of Germany | 310/207 |
| 0039105 | 3/1977 | Japan | 310/207 |

OTHER PUBLICATIONS

"Electrical Engineering" by L. A. Hazeltine, MacMillan Co; 1924; New York; pp. 490, 491.
"Electrical Engineering", vol. 1, D.C. Currents by C. L. Dawes, McGraw-Hill Book Co., New York & London, 1937; pp. 378–383.

Primary Examiner—R. Skudy
Attorney, Agent, or Firm—Jerome C. Squillaro

[57] ABSTRACT

An armature of an AC generator includes a plurality of polyphase windings. Each of the polyphase windings is a wave winding passing about substantially the entire circumference of the armature. In one embodiment, four three-phase windings are wave wound in the armature. External connection to each of the phases and the neutral of each three-phase winding is made through four connector quadrants disposed in four parallel planes. Connection to the remaining nine phases and three neutrals are made through further connector quadrants sharing respective planes with the first-mentioned connector quadrants.

3 Claims, 8 Drawing Sheets

PHASE-DISPLACED MULTIPLE POLYPHASE DYNAMOELECTRIC MACHINE WITH WAVE WINDINGS

BACKGROUND OF THE INVENTION

This invention was made with Government support under a contract with the U.S. Navy. The Government has certain rights in this invention.

The present invention relates to dynamoelectric machines and, more particularly, to large AC dynamoelectric machine having a large number of polyphase windings which are phase displaced from each other. In the case of generators, the large number of phases, when rectified, provide low ripple in a rectified DC output.

A conventional polyphase generator employs an armature having sets of lap windings spaced in phase belts about its perimeter. A lap winding can be though of as a coil of wire with axial runs of the coil disposed in slots in the inner perimeter of the armature facing a rotatable field member, or rotor. The lap windings are connected together by end turns, as necessary, to form the complete winding of the armature. A plurality of connection rings, one for each phase, are arranged at one end of the generator to connect all of the lap windings to external devices. In wye-connected armatures, zero, or a further one or three additional connection rings may be provided for connection of the neutral thereof, to external equipment.

The connection rings are generally nearly full circles of heavy copper bar. In a three-phase machine, for example, three, four or six connection rings are spaced at the end of the armature for connecting the AC power generated in the armature to external circuits. These connection rings require substantial space in the end of the generator. Such space requirements increase the overall size of the machine, and thus interfere with the usual desire for compact machinery fittable into limited space.

A wave winding is contrasted with a lap winding. A lap winding is essentially a closed coil disposed in a relatively small region of the circumference of the machine. A wave winding is an extended winding that makes progressive runs along the axis of the element upon which it is installed. The ends of the runs are connected together in progressive fashion so that the wave winding can make one or more unbroken passes about the entire circumference of the element on which it is installed. Wave windings have been used, for example, on the wound rotors of DC generators and motors and on the wound rotors of AC induction motors used, for example, as drive motors for wind tunnels. A general description of wave windings in this type of application is given in the text *Electrical Engineering*, Vol. 1—DC Currents, 3rd Ed., C L Dawes, Mcgraw Hill, 1937. DC generators having wave windings in their rotors produce higher voltage and lower current than their lap-wound counterparts. This is generally considered desirable for DC machinery.

Wave windings have been used in the rotors of wound-rotor induction motors to avoid pole-to-pole jumper connections that would be required with lap windings. This use results in a robust rotor winding that is easy to balance and easy to support. Such an application is discussed in *Electrical Engineering*, L A Hazeltine, MacMillan Company, 1924.

An AC generator whose output is to be rectified, or whose output is to be frequency-converted using, for example, a cycloconverter, faces special requirements. For such uses, it is desirable to reduce the amplitude of ripple harmonics in the rectified or frequency-converted output.

As noted above, wave windings have been used in rotors of motors and generators. The inventors are aware of the use of wave windings in the armatures of some hydroelectric generators, but such use is normally discouraged because the disadvantages of such wave windings overcome any advantage they may offer.

OBJECTS AND SUMMARY OF THE INVENTION

It is an object of the invention to provide an AC generator which minimizes the space required to accommodate connection rings for winding phase and neutral connection rings of dynamoelectric machines having a plurality of polyphase windings which are phase displaced from each other.

It is a further object of the invention to provide an AC dynamoelectric machine having an armature including a plurality of sets of polyphase windings, wherein the sets of polyphase windings are phase offset with respect to each other.

It is a still further object of the invention to provide a polyphase AC dynamoelectric machine having a plurality of sets of polyphase windings, wherein each set of polyphase windings includes a plurality of wave windings.

It is a still further object of the invention to provide a polyphase AC dynamoelectric machine having a plurality of sets of polyphase windings wherein connection rings for all sets of polyphase windings are arcs occupying substantially less than a full circle, whereby all of the connection rings are disposed in a common plane.

Briefly stated, the present invention provides an armature of an AC dynamoelectric machine including a plurality of polyphase windings. Each of the polyphase windings is a wave winding passing about substantially the entire circumference of the armature. In one embodiment, four three-phase wye-connected windings are wave wound in the armature. The four three-phase windings are spaced 15 electrical degrees apart for use with a 24-pulse rectifier. External connection to each of the phases and the neutral of each three-phase winding is made through four connector quadrants disposed in four parallel planes. Connection to the remaining nine phases and three neutrals are made through further connector quadrants sharing respective planes with the first-mentioned connector quadrants.

According to an embodiment of the invention, there is provided an armature for an AC dynamoelectric comprising: a first polyphase winding in the armature, the first polyphase winding being wave wound, at least a second polyphase winding in the armature, the at least a second polyphase winding being wave wound, the first and at least a second polyphase winding being phase displaced with respect to each other, a first plurality of connector sectors supported in first parallel planes adjacent the armature, at least a second plurality of connector sectors supported in second parallel planes adjacent the armature, each of the first parallel planes being coplanar with one of the second parallel planes, at least some phases of the first polyphase winding being connected to individual ones of the first plurality of connector sectors, and at least all remaining phases of the at least a second polyphase winding being connected to the second plurality of connector sectors.

According to a feature of the invention, there is provided an armature for an AC dynamoelectric machine comprising: first, second, third and fourth three phase windings in the armature, the first, second, third and fourth three phase winding being wave wound, the first, second, third and fourth three phase winding being phase displaced with respect to each other, first, second, third and fourth pluralities of connector sectors supported in first parallel planes adjacent the armature, the first, second, third and fourth pluralities of connector sectors each including a first sector in a first common plane, the first, second, third and fourth pluralities of connector sectors each including a second sector in a second common plane, the first, second, third and fourth pluralities of connector sectors each including a at least a third sector in a third common plane, and at least some phases of the first, second, third and fourth three phase windings being connected to individual ones of the first, second, third and fourth plurality of connector sectors, respectively.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention may be applied to a polyphase machine having any desired number of phases. For concreteness, however, the following description is directed to three-phase machinery, and more specifically to three-phase generators. The invention should not be considered limited by this choice of an illustrative embodiment.

Figure 1:
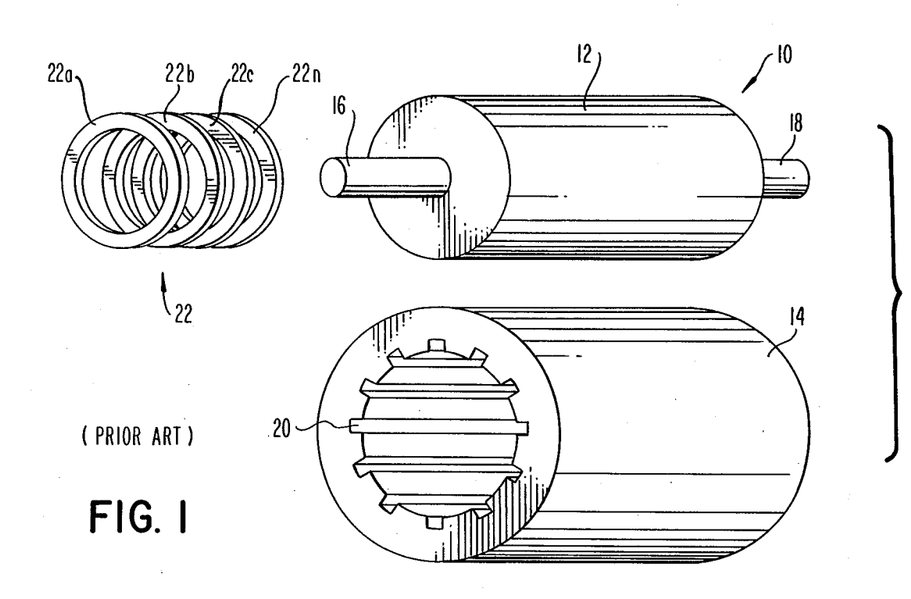
FIG. 1 is a simplified exploded schematic diagram of significant portions of a three-phase generator of the prior art to which reference will be made in identifying the locations of elements necessary to an understanding of the invention.
Figure 2A:
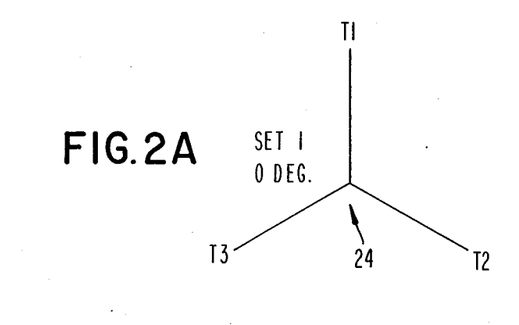
FIGS. 2A-2D are phasor diagrams of four three-phase windings of a generator according to the present invention.
Figure 2B:
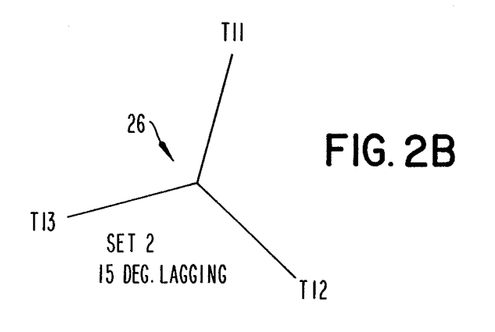
Figure 2C:
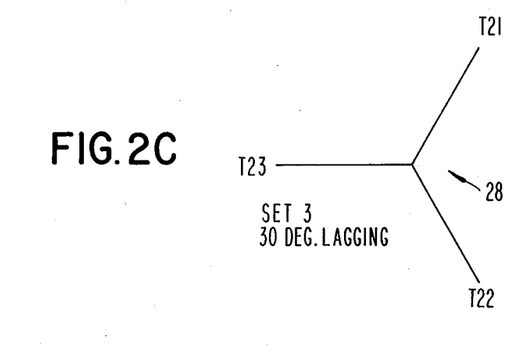
Figure 2D:
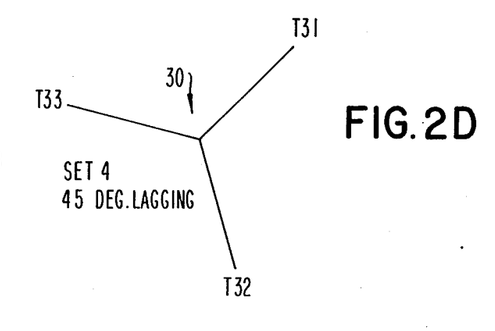

Referring now to FIG. 1, there is shown, generally at 10, a schematic representation of pertinent portions of a three-phase generator according to the prior art. Conventional elements of three-phase generator 10, which are unnecessary to a description of the invention, are omitted from the figure.

A cylindrical rotor 12 is rotatably supported inside an annular armature 14 by conventional bearings, not shown, using shafts 16 and 18. A plurality of slots 20 in an interior of armature 14 contain one or more conductor bars (not shown) extending in straight runs parallel to the longitudinal axis of armature 14. Each end of each conductor bar is connected to a selected end of another conductor bar, using an end turn, in a pattern that, in the aggregate forms connected circuits making up the windings of armature 14.

Conventionally, the windings are connected to form closed coils, above identified as lap windings. The power output of each of the phases of a lap-wound three-phase generator 10 is found at several locations spaced about the circumference of armature 14. A plurality of connection rings 22 are stacked coaxially at one end of three-phase generator 10 for connection of the three-phase output of three-phase generator 10 from the windings of three-phase generator 10 to external circuits (not shown). In a wye-connected version of three-phase generator 10, four connection rings 22a, 22b, 22c and 22n are used to connect the three phases of the power plus the neutral connection for all phases to external devices.

The full circle of each connection ring is required because the points at which the connections are made thereto are spaced about the circumference of slot 20.

The four connection rings 22a, 22b, 22c and 22n are stacked coaxially in four planes at the end of three-phase generator 10, usually supported by tying to support bars in stator frame (not shown).

When rectified, the DC output of three-phase generator 10 contains a substantial ripple component, including higher electrical noise components. In applications requiring very low ripple, or very low noise, means must be provided for reducing the ripple. In low-power devices, filtering using capacitors and/or inductors may provide acceptable levels of output ripple. In high-power devices, the size, weight and cost of filter components makes their use unattractive.

One alternative, addressed by the inventors, includes providing more than one set of three-phase windings phase-displaced about the circumference of armature 14. That is, two or more sets of three-phase windings are disposed in slots 20 and connected for external access.

Referring momentarily also to FIGS. 2A-2D, four separate three-phase windings 24 (FIG. 2A), 26 (FIG. 2B), 28 (FIG. 2C) and 30 (FIG. 2D) are disposed in slots 20 with a phase displacement therebetween. In the three-phase windings illustrated in the figures, a phase displacement of 15 electrical degrees is illustrated. That is, the relative phase of three-phase winding 24 is arbitrarily identified as zero electrical degrees, that of three-phase winding 26 is 15 electrical degrees, that of three-phase windings 28 is 30 electrical degrees and that of three-phase winding 30 is 45 electrical degrees. When the outputs of four three-phase windings 24-30 are rectified and summed, the characteristic harmonic in the ripple in the rectified DC output is much higher in frequency and much lower in amplitude than is the case for the single three-phase winding assumed to be placed in three-phase generator 10 of FIG. 1.

Returning now to FIG. 1, the use of four sets of three phase lap windings produces a problem. That is, each of the sets of three phase windings requires four connection rings. With four sets of three phase windings, a total of sixteen connection rings must be disposed in sixteen planes. Such a large number of connection rings must be supported and mutually insulated. The large cantilevered mass, occupying about 24 axial inches, cannot be supported on end turns, as can the four connection rings 22 of a three-phase machine. Thus, additional supporting equipment must be designed and built. In addition, the substantial extra length would increase substantially the overall length of three-phase generator 10.

Figure 3:
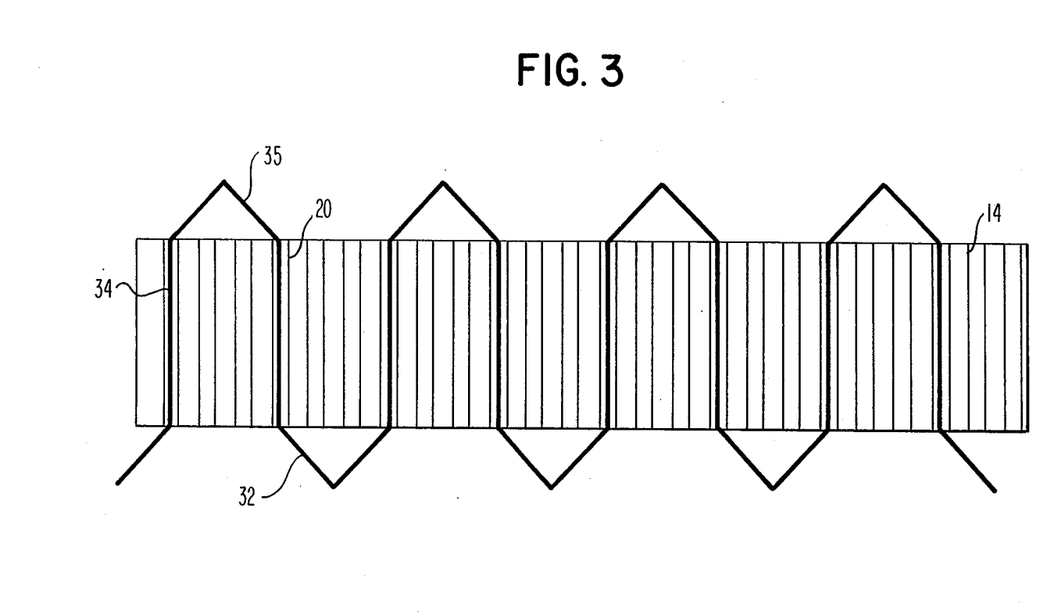
FIG. 3 is a developed armature of a three-phase generator winding showing one phase of one wave winding.

Referring now to FIG. 3, armature 14 is shown developed, or laid out flat, for purposes of illustration. A wave winding 32 consists of conductor bars 34 laid into slots 20 and connected together by end turns 35. As seen in the figure, the connection of successive conductor bars 34 is progressive, whereby slots 20 in substantially the entire circumference of armature 14 receive conductor bars 34. In one embodiment of the invention two complete passes are taken about the circumference of armature 14 by the same winding.

The illustration in FIG. 3 covers only one phase winding of one of the four sets of three phase windings. Other, unillustrated, conductor bars 34 are laid in others of the slots 20 to form the remaining two windings making up the three-phase set with wave winding 32. In addition, the two remaining phase windings associated with the one illustrated phase winding, plus nine other phase windings for the other three sets of three phase windings are wave wound in slots 20 in their relative phase positions about the circumference of armature 14.

One advantage of a wave winding in the present application is that, since they encircle the entire circumference of armature 14, connection can be made to any wave winding 32 at almost any point about the circumference, rather than at very limited specific points, as is the case with lap windings. Thus, the full-circle connection rings of FIG. 1 are not required to permit connection to each phase and neutral.

Figure 4:
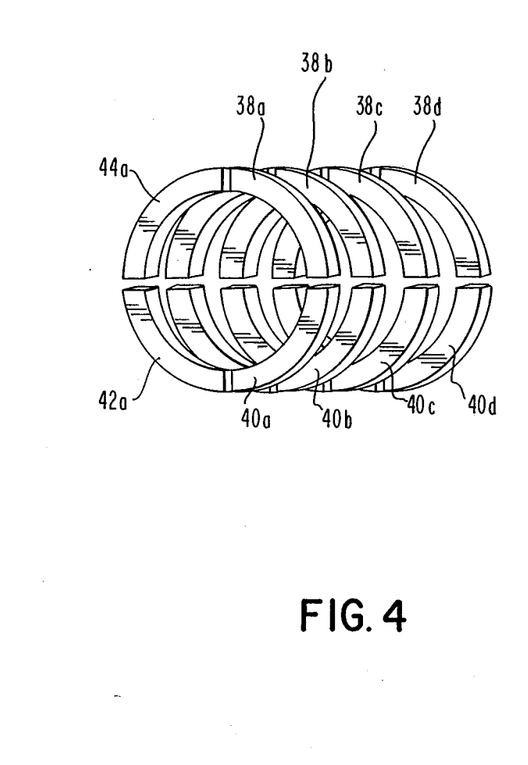
FIG. 4 is a closeup view of a portion of an end of a generator employing connector quadrants according to an embodiment of the invention.

Referring now to FIG. 4, there is shown, generally at 36, a wave-wound four-winding three-phase generator according to an embodiment of the invention. As in the prior-art device above, windings and other elements not necessary to the present part of the disclosure are omitted. A first stack of connector quadrants 38a, 38b, 38c and 38d are disposed in parallel planes to receive the three phases and the neutral connections of one of the four three-phase windings in armature 14. Similarly, a second stack of connector quadrants 40a, 40b, 40c and 40d are disposed in common planes with their similarly-suffixed counterparts in the first stack to receive the three phases and neutral connections of another of the four three-phase windings. Further, third and fourth stacks of connector quadrants 42a–42d and 44a–44d occupy the remaining quadrant positions. As a consequence of each connector quadrant occupying less than a full quadrant, each plane permits connection to corresponding phases of all of the four three phase windings of wave-wound four-winding three-phase generator 36. Accordingly, connections are provided for the twelve phases and four neutrals in the same space as is required for connection for the three phases and one neutral using conventional connection rings 22 of FIG. 1.

It will be recognized that a full quadrant may not be required for providing connection to the three phases and the neutral of one or more of the three-phase windings. Thus, the connector quadrants could more accurately be referred to as connector sectors. In some instances, the connector sectors may depart from the form of a portion of an annulus. For example, an angled piece of conductive metal may suffice for providing connection to at least some of the phases. It is believed that an angle piece can be identified as a connector sector, and such a relationship should be read into the present description and claims.

Figure 5:
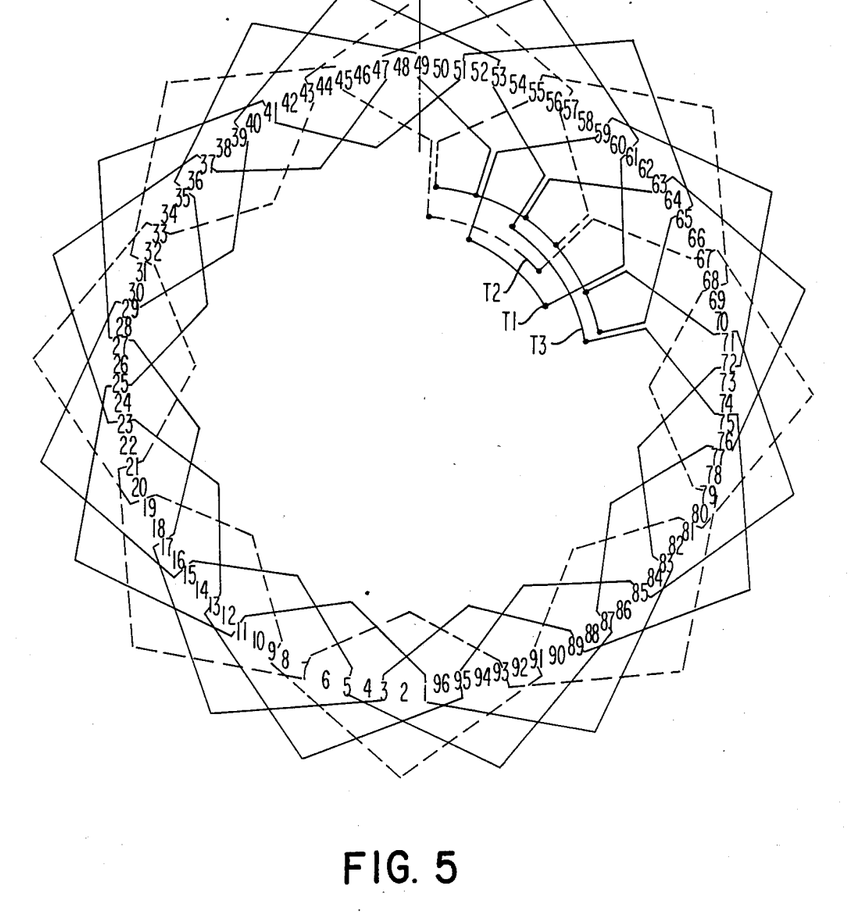
FIGS. 5-8 are connection diagrams of the four three-phase windings of a generator according to the present invention, including connection of the three-phase windings to their respective connection quadrants.
Figure 6:
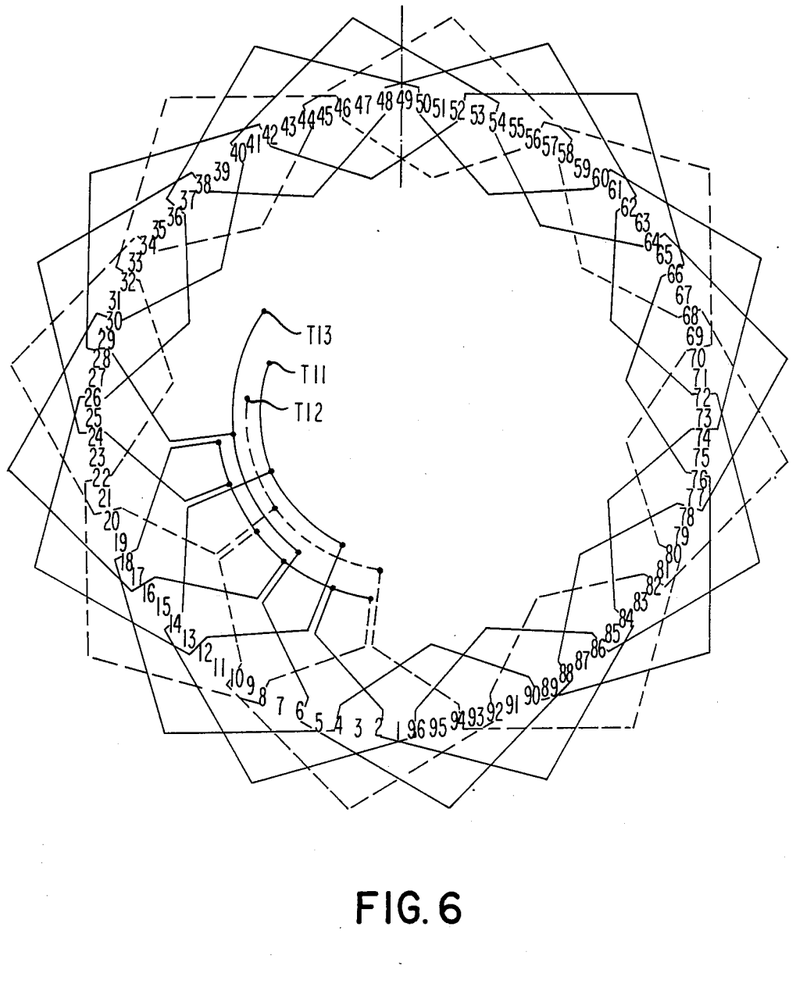
Figure 7:
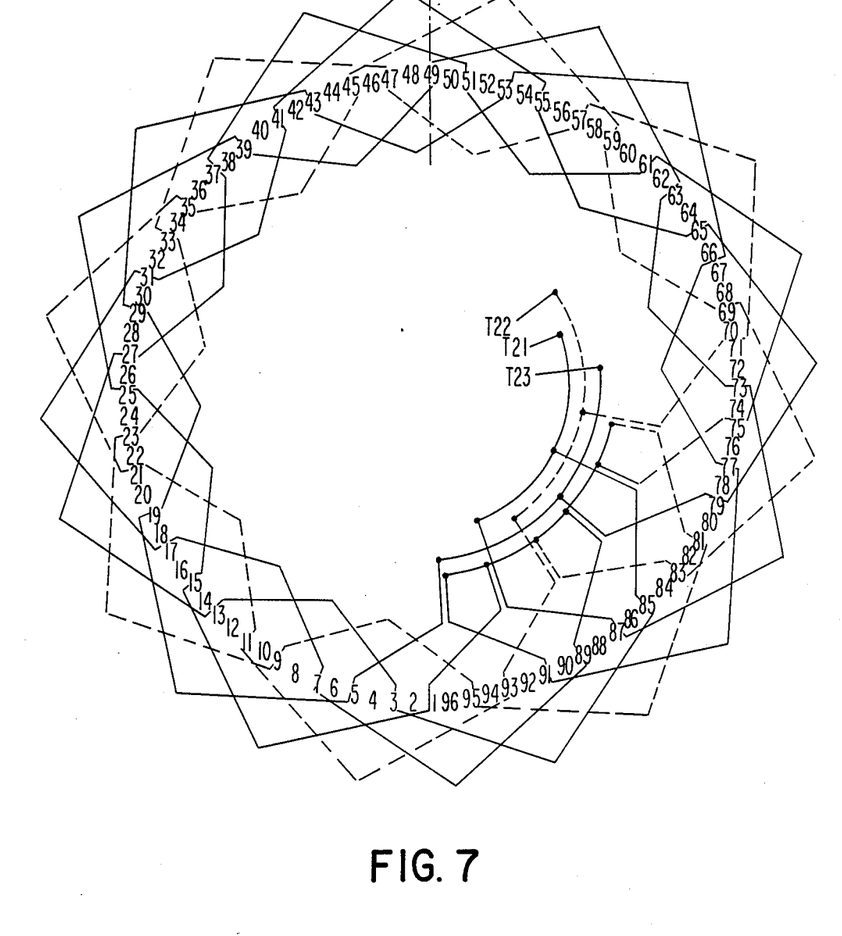
Figure 8:
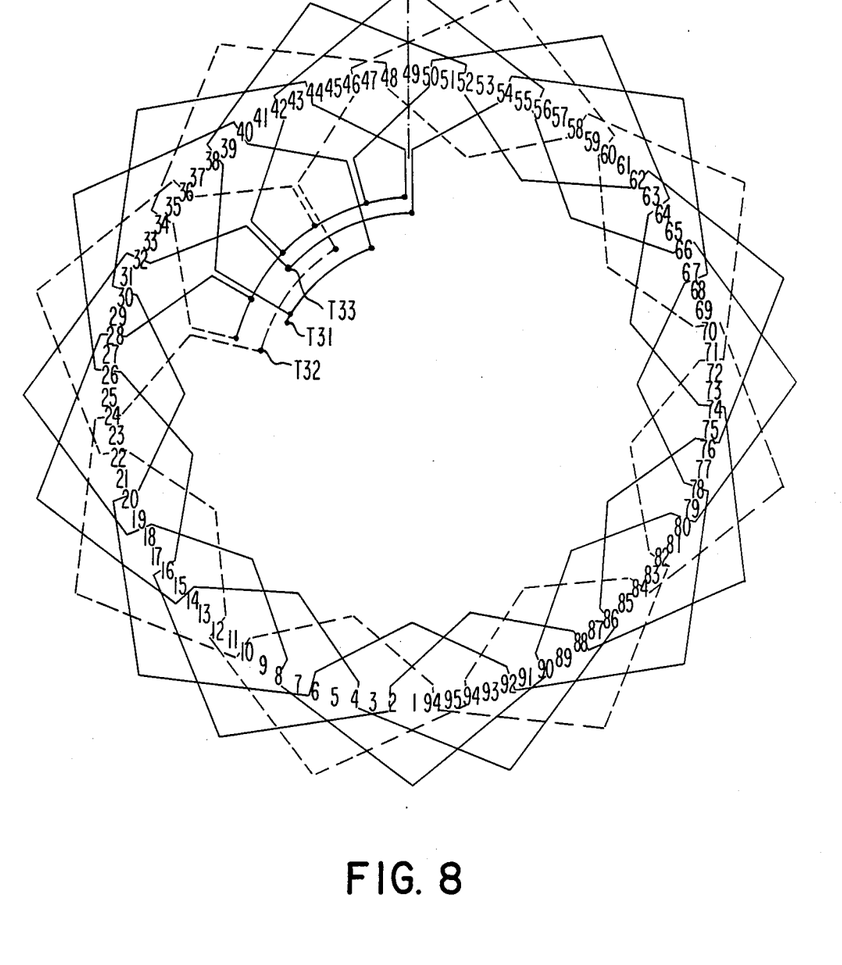

FIG. 5 shown the routing of conductor bars 34 through a 96-slot armature 14 for one of the three-phase windings, and the connection of the phases and neutral to its respective connector quadrants. Similarly, FIGS. 6–8 show routing and connectors for the remaining three three-phase windings.

The numerals on an outer circle in FIGS. 5–8 indicate the slot numbers of the 96 slots through which the windings pass. Such numbering is completely conventional and would be fully understood by one skilled in the art. The terminals $T_1$, $T_2$, $T_3$ (FIG. 5), $T_{11}$, $T_{12}$, $T_{13}$ (FIG. 6), $T_{21}$, $T_{22}$, $T_{23}$ (FIG. 7), $T_{31}$, $T_{32}$, $T_{33}$ (FIG. 8) near the center of FIGS. 5–8 correspond to the four sets of three-phase windings shown schematically in FIGS. 2A–2D respectively. The terminals are identified by $T_{xy}$, where x=winding number and y=phase number.

It would be clear to one skilled in the art that the present invention is not limited to a device including four three-phase windings. In one embodiment of the invention, two phase-displaced three-phase windings are employed. The two-winding device, although it reduces ripple in a rectified output, may require further smoothing of the rectified output using, for example, a large inductor, to attain very low levels of ripple. The size, weight and cost of such a large inductor makes the two-winding embodiment less attractive than the four-winding alternative. Three-winding, five-winding, and other numbers of three phase windings would be drawn to mind of one skilled in the art with the present disclosure for reference. In addition, the present invention defines a polyphase system, of which a three-phase device is only illustrative. Two phases and four or more phases may be employed in each winding without departing from the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An armature for an AC generator comprising:
   a first polyphase winding in said armature;
   said first polyphase winding being wave wound;
   at least a second polyphase winding in said armature;
   said at least a second polyphase winding being wave wound;
   said first and at least a second polyphase winding being phase displaced with respect to each other;
   a first plurality of connector sectors supported in first parallel planes adjacent said armature;
   at least a second plurality of connector sectors supports in second parallel planes adjacent said armature;
   each of said first parallel planes being coplanar with one of said second parallel planes;
   at least some phases of said first polyphase winding being connected to individual ones of said first plurality of connector sectors; and
   at least all remaining phases of said at least a second polyphase winding being connected to said second plurality of connector sectors.

2. An armature according to claim 1 wherein said first and second pluralities of connector sectors are first and second pluralities of connector quadrants.

3. An armature for an AC generator comprising:

first, second, third and fourth three phase windings in said armature;

said first, second, third and fourth three phase winding being wave wound;

said first, second, third and fourth three phase winding being phase displaced with respect to each other;

first, second, third and fourth pluralities of connector sectors supported in first parallel planes adjacent said armature;

said first, second, third and fourth pluralities of connector sectors are including a first sector in a first common plane;

said first, second, third and fourth pluralities of connector sectors each including a second sector in a second common plane;

said first, second, third and fourth pluralities of connector sectors each including a at least a third sector in a third common plane; and at least some phases of said first, second, third and fourth three phase windings being connected to individual ones of said first, second, third and fourth plurality of connector sectors, respectively.

* * * * *